(12) United States Patent
Karr

(10) Patent No.: US 11,297,813 B2
(45) Date of Patent: Apr. 12, 2022

(54) FISHING REEL COVER

(71) Applicant: Ricky Karr, Carlsbad, CA (US)

(72) Inventor: Ricky Karr, Carlsbad, CA (US)

( * ) Notice: Subject to any disclaimer, the term of this patent is extended or adjusted under 35 U.S.C. 154(b) by 0 days.

(21) Appl. No.: 17/064,411

(22) Filed: Oct. 6, 2020

(65) Prior Publication Data
US 2021/0105987 A1    Apr. 15, 2021

Related U.S. Application Data

(60) Provisional application No. 62/912,866, filed on Oct. 9, 2019.

(51) Int. Cl.
*A01K 89/01* (2006.01)
*A01K 89/015* (2006.01)

(52) U.S. Cl.
CPC .............................. *A01K 89/0192* (2015.05)

(58) Field of Classification Search
CPC ...................... A01K 89/0192; A01K 89/01121
See application file for complete search history.

(56) References Cited

U.S. PATENT DOCUMENTS

| | | | | |
|---|---|---|---|---|
| 2007/0246589 | A1* | 10/2007 | Martin | A01K 89/0192 242/310 |
| 2015/0272102 | A1* | 10/2015 | Tsutsumi | A01K 89/01121 242/224 |
| 2015/0272103 | A1* | 10/2015 | Blosch | A01K 89/0192 242/311 |

* cited by examiner

*Primary Examiner* — Emmanuel M Marcelo
(74) *Attorney, Agent, or Firm* — Eric Hanscom

(57) ABSTRACT

A cover for the end of a fishing reel provides a user with a clean and attractive cover for scratches and other damage. Several versions are described: a first cover which replaces an insert and a second which covers the entire end of the reel. The cover is opaque such that it hides scratches and is easily removed or replaced with another cover.

7 Claims, 2 Drawing Sheets

FISHING REEL COVER

CROSS REFERENCE TO RELATED APPLICATIONS

This application claims priority back to U.S. Provisional No. 62/912,866, filed Oct. 9, 2019, the contents of which are incorporated herein by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of fishing gear, and more specifically, to more specifically to a cover for the end of a fishing reel provides a user with a clean and attractive cover for scratches and other damage. Several versions are contemplated: a first cover which replaces an insert and a second which covers the entire end of the reel. The cover can be clear such that the underlying metal shows through, or opaque such that it hides scratches and is easily removed or replaced with another cover, or it can be manufactured as part of the reel such that is can be replaced if and when it gets scratched.

Brief Description of Invention

The invention is a circular piece of vinyl, plastic, metal, or another material that can be attached to a fishing reel. For reels in which the end is slightly bulging outward, the metal version could be "pre-deformed" for a perfect fit. The plastic and vinyl versions can bend over either a flat end or a bulging end. With reels where the end comprises an insert, the invention can either replace the insert or cover it over. With reels where the end is one continuous piece of metal or plastic, the invention will cover part or all of the end of the reel.

Creation of the problem this invention solves. Fishing equipment is often subjected to rough treatment. Putting in a boat for a fishing trip, leaning up against the railing on a fishing pier, or even just sticking a garage until the next fishing trip can lead to a scratched reel very easily. This results not only in an unattractive fishing reel, but also can also endanger the delicate internal workings of reel should a seal be cracked.

Thus, there has existed a long-felt need for means by which the end of a fishing reel can be both protected and made more attractive. The current invention provides just such a solution by having a cover that goes over all or part of the end of a fishing reel. The fishing reel cover both seals the end of the reel and covers up any scratches or other blemishes on the exterior, and can be easily replaced should it get scratched.

OBJECTS OF THE INVENTION

It is therefore an object of the present invention to provide protection to the seal of a fishing reel.

An additional object of the invention is to provide a decorative cover to the end of a fishing reel.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

BRIEF DESCRIPTION OF THE FIGURES

One preferred form of the invention will now be described with reference to the accompanying drawings.

REFERENCE NUMBERS USED

Figure 1:
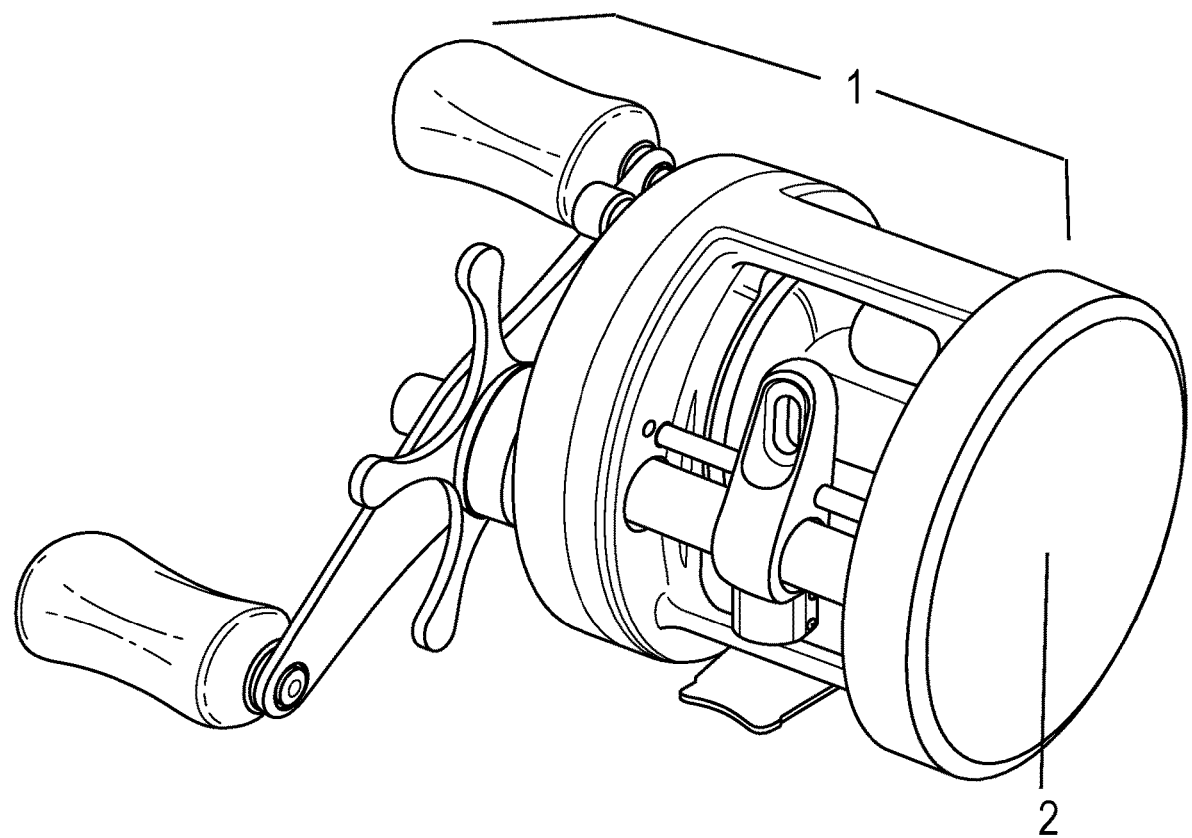
FIG. 1 is a perspective view of the invention.

1. Fishing reel generally
2. End of fishing reel
3. Scratches on end of fishing reel
4. Protective cover

DETAILED DESCRIPTION OF THE FIGURES

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

FIG. 1 is a perspective view of the invention. A fishing reel 1 has a protective cover 2 attached on its end. The protective cover is opaque and hides scratches and other blemishes on the end of the fishing reel 1, and covers any broken seals under the protective cover 2.

Figure 2:
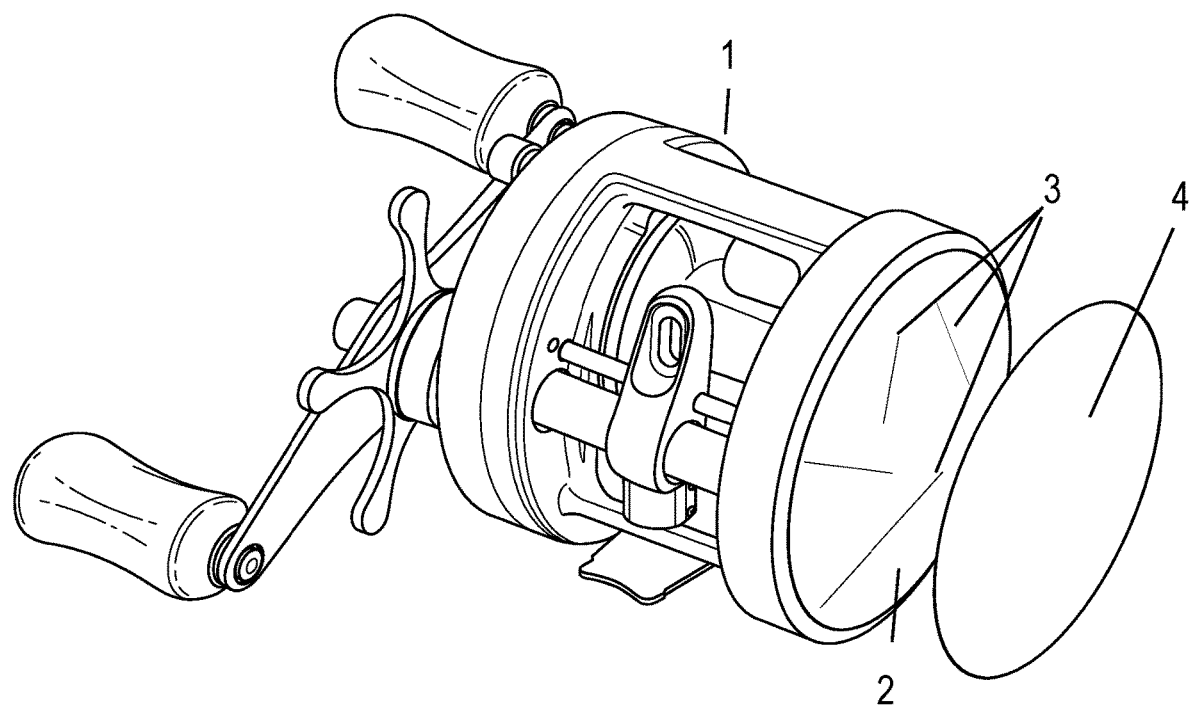
FIG. 2 is a perspective view of the invention showing attachment of the invention to the end of a fishing reel.

FIG. 2 is a perspective view of the invention showing attachment of the invention to the end 2 of a fishing reel 1. The end 2 in this figure is the original end of the fishing reel 1. The end 2 has a number of scratches 3, that the cover 4, will cover up and hide from view.

In a preferred embodiment, the invention provides a cover for protecting the end of a fishing reel, consisting of: a roughly circular cover with a cover diameter, where the cover diameter is less than a reel end diameter, where the cover is removable, and additionally comprising an adhesive, where the adhesive removably attaches the cover to a reel end, where the adhesive is selected from the group consisting of waterproof glue and waterproof epoxy, where the cover is made from a material, and where the material is selected from the group consisting of vinyl, plastic, and metal, where the cover is made from metal, where the metal is Grade 204 stainless steel, where the cover has a bend allowance, and where the bend allowance is between 18 and 21.5, where the cover has a K-factor, and the K-factor is between 0.25 to 0.33, where the cover has a thickness, and where the thickness is between 1 mm and 2 mm, where the metal is Grade 204 stainless steel, where the cover has a bend allowance, and where the bend allowance is between 19.5 and 20.5, and where the cover has a K-factor, and the K-factor is between 0.25 to 0.33. These specifics of the material provide a cover that has excellent characteristics in terms of how easily it attaches to a reel end, and how it effectively bends to accommodate any "bulge" on the end of the reel.

In another embodiment, the invention provides a cover for protecting the end of a fishing reel, comprising: a roughly circular cover with a cover diameter, where the cover diameter is less than a reel end diameter, where the cover is removable, and additionally comprising an adhesive, where the adhesive removably attaches the cover to a reel end, where the adhesive is selected from the group consisting of waterproof glue and waterproof epoxy, and, where the cover is made from a material, and where the material is selected from the group consisting of vinyl, plastic, and metal.

In this embodiment, the metal can be stainless steel or aluminum, with a bend allowance between 10 and 25, where a K-factor between 0.1 to 0.5, and a thickness between 0.5 mm and 1.5 mm. While a preferred embodiment calls for the cover to be made from metal, it is also contemplated that vinyl and plastic could be used as potential materials.

In a final embodiment, the cover is designed for a fishing reel in which a shallow indentation in the shape of the cover is built into the end of the reel, such that during the manufacturing process, the cover is removably adhered to the shallow indentation. When the cover becomes unsightly or scratched, the cover can be removed and replaced with another cover.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

The invention claimed is:

1. A cover for protecting an end of a fishing reel, consisting of: a cover, where the cover has a roughly circular shape, with a cover diameter, where the cover diameter is less than a reel end diameter, where the cover is removable, and additionally comprising an adhesive, where the adhesive removably attaches the cover to a reel end, where the adhesive is selected from the group consisting of waterproof glue and waterproof epoxy, where the cover is made from a material, and where the material is selected from the group consisting of vinyl, plastic, and metal.

2. The cover of claim 1, where the metal is Grade 204 stainless steel, where the cover has a bend allowance, and where the bend allowance is between 18 and 21.5, where the cover has a K-factor, and the K-factor is between 0.25 to 0.33.

3. The cover of claim 1, where the cover has a thickness, and where the thickness is between 1 mm and 2 mm.

4. The cover of claim 3, where the metal is Grade 204 stainless steel, where the cover has a bend allowance, and where the bend allowance is between 19.5 and 20.5.

5. The cover of claim 4, where the cover has a K-factor, and the K-factor is between 0.25 to 0.33.

6. A cover for protecting an end of a fishing reel, comprising: a roughly circular cover with a cover diameter, where the cover diameter is less than a reel end diameter, where the cover is removable, and additionally comprising an adhesive, where the adhesive removably attaches the cover to a reel end, where the adhesive is selected from the group consisting of waterproof glue and waterproof epoxy, where the cover is made from a material, and where the material is selected from the group consisting of vinyl, plastic, and metal, where the metal is Grade 204 stainless steel.

7. The cover of claim 6, where the cover has a bend allowance, and where the bend allowance is between 18 and 21.5.

\* \* \* \* \*